July 10, 1956     P. W. FRANKLIN     2,754,470
SATURABLE CORE DEVICE AND GENERATOR CONTROLLED THEREBY
Filed July 25, 1951
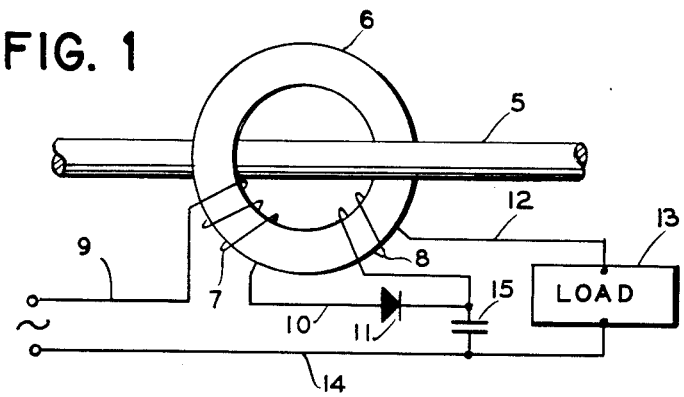
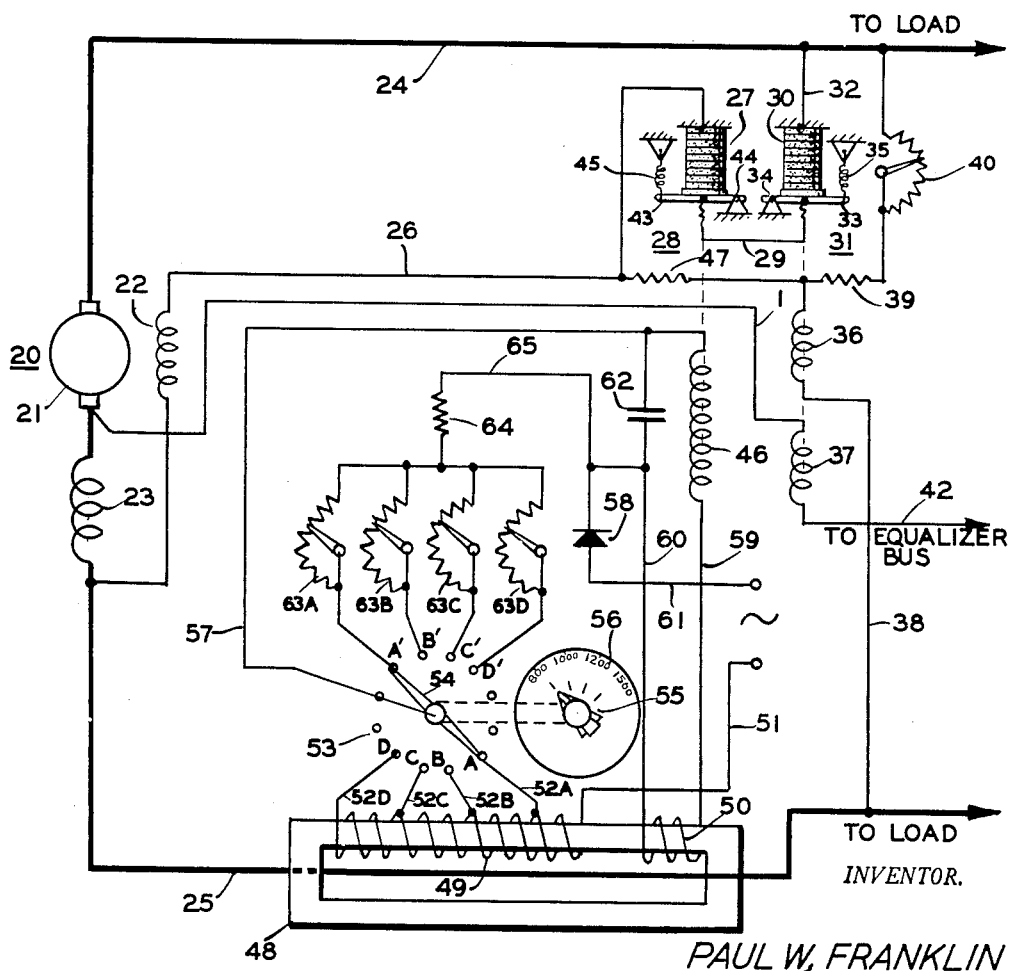
INVENTOR.
PAUL W. FRANKLIN
BY James M. Nickles
ATTORNEY United States Patent Office
2,754,470
Patented July 10, 1956

2,754,470

SATURABLE CORE DEVICE AND GENERATOR CONTROLLED THEREBY

Paul W. Franklin, Nutley, N. J., assignor to Bendix Aviation Corporation, Teterboro, N. J., a corporation of Delaware Application July 25, 1951, Serial No. 238,420

6 Claims. (Cl. 322—25)

The present invention relates to apparatus for measuring direct currents and more particularly to the use of saturable inductances for measuring direct currents.

In order to avoid the disadvantages of a large D. C. shunt and to provide a convenient method of measuring large D. C. currents, various arrangements of saturable reactors have been used. The arrangements heretofore used have required a three-legged lamination or two toroids for single phase excitation.

For certain arrangements the primary D. C. current, which is to be measured flows through a very large conductor or bus bar, which makes the use of a loop impractical. Under the present methods at least two toroids would be necessary.

Under the present invention a capacitor is provided in parallel with the load to provide a "flywheel action" thus enabling the use of only one toroid and rectifier.

It is an object of the invention to provide a direct current measuring arrangement of the magnetic saturation type in which an auxiliary alternating current source is employed.

Another object of the invention is to provide an improved D. C. current transformer.

Another object of the invention is to provide means for measuring D. C. current.

Another object of the invention is to provide a direct current measuring arrangement of the magnetic saturation type wherein only one toroid is required.

Another object of the invention is to provide a novel current regulator for a direct current generator.

Another object of the invention is to provide a direct current measuring arrangement using a saturable reactance and a capacitor to provide a "flywheel" effect.

Another object of the invention is to provide a direct current measuring arrangement that is substantially independent of voltage and frequency changes.

The above and other objects and features of the invention will appear more fully hereinafter from a consideration of the following description taken in connection with the accompanying drawing wherein two embodiments are illustrated by way of example. It is to be understood, however, that the drawing is for purposes of illustration only and is not designed as a definition of the limits of the invention.

In the drawing:

Figure 1 is a schematic diagram illustrating the principle of the invention.

Figure 2 is a schematic diagram illustrating an embodiment of the invention in a generator system.

Referring now to Figure 1, the numeral 5 represents a direct current conductor in which it is desired to measure the current. The conductor 5 is surrounded by a magnetic core 6 on which are wound an alternating current winding 7 and a feedback winding 8. One end of the winding 7 is connected to one terminal of a suitable alternating current source (not shown) by a conductor 9. The other end of the winding 7 is connected by a conductor 10 to one end of the winding 8. A rectifier 11 is inserted in the conductor 10. The rectifier 11 may be any one of the conventional types. The other end of the winding 8 is connected by a conductor 12 to one side of a load 13. The other side of the load 13 is connected by conductor 14 to the other side of the A. C. source (not shown). A capacitor 15 is connected in parallel with the winding 8 and load 13.

In operation, the D. C. current flows in the conductor 5 and is the saturating current for the core 6. The A. C. circuit feeds the load 13 through the primary winding 7 through the rectifier 11, which acts as a valve, and feedback winding 8. The capacitor 15, connected in parallel with the load 13 and feedback winding 8 is charged through the rectifier on the half cycle and discharges through the load on the other half cycle. Thus, by making use of the storage capacity of the capacitor, only half of the normal circuit is required. The size of the capacitor 15 depends upon the current drain of the load, frequency and time constant of the capacitor branch.

The load may be a resistor, measuring instrument or control winding. The ratio between the D. C. current in the line and the rectified D. C. current flowing through the load provides a good approximation of the D. C. current in the line that is substantially independent for a wide range of frequency and voltages provided that the load resistance is kept within suitable proportions. It has been found that by proportioning the components for maximum voltage and minimum frequency, voltage and frequency changes have substantially no effect on the output of the rectified D. C. supplied to the load within wide limits provided a suitable core material is used.

Figure 2 illustrates a practical application of the invention for current control in a generator system.

A direct current generator is indicated generally by the numeral 20 and has an armature 21, shunt field winding 22 and a series field winding 23. The armature 21 may be driven by any suitable prime mover (not shown). The generator 20 is connected to a suitable load (not shown) by conductors 24 and 25. One end of the winding 22 is connected to the conductor 25. The other end of the winding 22 is connected by conductor 26 to one side of a carbon pile resistance element 27 of a current regulator 28. The other side of the element 27 is connected by a conductor 29 to one side of a carbon pile resistance element 30 of a voltage regulator 31. The other side of the element 30 is connected by a conductor 32 to the output line 24.

The voltage regulator 31 is illustrated diagrammatically herein as including an armature 33 pivoted at 34 and biased by a spring 35 in a direction for decreasing the resistance of the carbon pile element 30. Opposing the spring 35 are electromagnetic control windings 36 and 37. The winding 36 is connected by conductor 38, resistor 39 and variable resistor 40 across the output lines 24 and 25.

The winding 37 has one side connected by conductor 41 to the output terminal adjacent to the series winding 23 of the generator 20. The other side of the winding 37 is connectable by conductor 42 to an equalizer bus (not shown). The winding 37 function to insure a proper distribution of load when the generator 20 is connected in a multiple generator system.

The current regulator 28 is illustrated diagrammatically herein as including an armature 43 pivoted at 44 and biased by a spring 45 in a direction for decreasing the resistance of the carbon pile element 27. Opposing the spring 45 is an electromagnetic winding 46 responsive to the current flowing in the conductor 25.

A stabilizing resistor 47 may be connected across the carbon pile elements 27 and 30.

The conductor 25 is surrounded by a magnetic core 48 on which are wound a multi-tapped primary winding 49 and a feedback winding 50. One end of the winding 49 is connected by a conductor 51 to one terminal of a suitable A. C. source (not shown). Taps 52A, 52B, 52C and 52D are connected to respective contacts 53A, 53B, 53C and 53D of a multi-contact switch 53. The switch 53 has a rotatable contact member 54, one arm of which is adapted for cooperation with the contacts 53A, 53B, 53C and 53D, the other arm is adapted for cooperation with contacts 53A', 53B', 53C' and 53D'. The member 54 is connected for rotation to a knob 55. A suitable dial 56 may be provided. The contact member 54 is connected by a conductor 57 to one end of the winding 46. The other end of the winding 46 is connected in series with the feedback winding 50 and a rectifier 58 by conductors 59, 60 and 61 to the other terminal of the A. C. source (not shown). A capacitor 62 is connected in parallel with the windings 50 and 46.

One end of the variable resistors 63A, 63B, 63C and 63D are connected to the respective contacts 53A', 53B', 53C' and 53D' of the switch 53. The other end of the resistors 63A, 63B, 63C and 63D are connected to one end of resistor 64. The other end of resistor 64 is connected by a conductor 65 to the conductor 60. Thus, it can be seen that the resistors 63A, 63B, 63C and 63D are adapted to be selectively connected in series with the resistor 64 to provide a shunt path for a portion of the current across the winding 46. This permits finer adjustment of the operation of the winding 46.

In operation, the D. C. current flowing in the conductor 25 is sensed in the same manner as described in Figure 1, the load across the A. C. circuit being the control winding 46. Thus it can be seen that the winding 46 affects a control on the current regulator 28 substantially in proportion to the current in the conductor 25. As the current in the conductor 25 tends to increase the winding 46 increases the resistance in the regulator 28 thus reducing the current output of the generator 20.

The taps on the winding 49 permit the selection of the proper number of turns for the winding 49 for predetermined current values for which it is desired to limit and thereby maintain the current regulator within its working range. The switch 53 selects the tap desired and also places the proper resistance in parallel with the winding 46. The taps provide a coarse adjustment and the shunt resistors provide means for making fine adjustments.

Although only two embodiments of the invention have been illustrated and described, various changes in the form and relative arrangement of the parts, which will now appear to those skilled in the art, may be made without departing from the scope of the invention.

What is claimed is:

1. A saturable core device comprising a direct current conductor, a core of magnetic material surrounding said conductor, an alternating current winding on said core, an output circuit, means including a half wave rectifier and a feedback winding on said core connecting said alternating current winding in series with said output circuit across a source of alternating current, and a capacitor connected in parallel with said feedback winding and said output circuit, whereby the current flowing in said output circuit is proportional to the current flowing in said direct current conductor.

2. A saturable core device comprising a direct current primary winding, a magnetic core surrounding said primary winding, an alternating current circuit including a winding on said core, a load circuit, means including a half wave rectifier connecting said alternating circuit to said load circuit, and a capacitor connected in parallel to said load circuit, said capacitor being charged from said alternating circuit through said rectifier on the positive half wave and discharged through said load circuit on the negative half wave.

3. A system for measuring direct current comprising a core of saturable material, means including a conductor passing through said core for subjecting said core to unidirectional magnetizing force responsive to a direct current to be measured, an alternating current circuit having a winding responsive to the magnetizing force in said core to affect the output of said alternating current circuit as a function of said magnetizing force, an output circuit, half wave rectifier means for connecting said alternating current circuit to said output circuit, and a storage capacitor connected across said output circuit, said capacitor being charged when said rectifier is conducting and discharged when no current is passing through said rectifier, the current flowing in said output circuit being proportional to the direct current to be measured.

4. Direct current responsive apparatus comprising a conductor adapted to carry direct current to be measured, a core of saturable magnetic material surrounding said conductor, a source of alternating current, an alternating current winding on said core, an output circuit, means including a half wave rectifier for connecting said alternating current winding in series with said output circuit to said alternating current source, and a storage capacitor connected across said output circuit whereby the current in said output circuit is proportional to the direct current to be measured.

5. The combination as defined in claim 4 and including a feedback winding on said core connected in series between said rectifier and said output circuit.

6. In combination, a generator having a shunt field winding, a series field winding and output lines, first and second variable resistance elements in series with said shunt field winding, a control winding for said first resistance element connected across said output lines and responsive to the voltage therein, a control winding for said second resistance element, circuit means for energizing said second control winding in accordance with the current flowing in said output lines, said means comprising a core of magnetic material surrounding one of said output lines, an alternating current winding on said core, a source of alternating current for energizing said alternating current winding, a half wave rectifier for connecting said alternating current winding to said second control winding, and a capacitor connected across said second control winding whereby the current flowing in said second control winding is proportional to the current flowing in said output lines.

References Cited in the file of this patent

UNITED STATES PATENTS

| 2,467,807 | Camilli et al. | Apr. 19, 1949 |
| 2,482,474 | Giselman | Sept. 20, 1949 |
| 2,554,203 | Morgan | May 22, 1951 |
| 2,605,302 | Specht | July 29, 1952 |

FOREIGN PATENTS

| 534,667 | Great Britain | Mar. 13, 1941 |